United States Patent
Knott

[15] 3,707,033
[45] Dec. 26, 1972

[54] MANUFACTURING METHOD FOR MULTI-ELEMENT STRUCTURES

[72] Inventor: James M. Knott, Wellesley, Mass.

[73] Assignee: Coatings Engineering Corporation, Natick, Mass.

[22] Filed: Aug. 24, 1970

[21] Appl. No.: 66,222

[52] U.S. Cl. ..................29/460, 117/99, 156/91, 220/19
[51] Int. Cl. ..................B23p 3/00, B23p 19/04
[58] Field of Search ..........29/460; 220/19; 117/99; 156/91

[56] References Cited

UNITED STATES PATENTS

| | | |
|---|---|---|
| 52,094 | 1/1866 | Topliff et al.................117/99 |
| 529,377 | 11/1894 | Guinard....................117/99 UX |
| 2,058,165 | 10/1936 | McCoy........................117/99 |
| 2,804,213 | 8/1957 | Fox et al.................220/19 UX |
| 2,948,047 | 8/1960 | Peeler et al................29/460 X |
| 3,302,276 | 2/1967 | Williams et al...............29/460 X |

*Primary Examiner*—Charlie T. Moon
*Attorney*—John E. Toupal

[57] ABSTRACT

Disclosed is a method for fabricating multi-element latticed structures including temporary fastening of the elements and subsequent plastic encapsulation of the entire structure to provide structural integrity.

18 Claims, 6 Drawing Figures

James M. Knott
INVENTOR.

BY John E. Toupal
ATTORNEY

MANUFACTURING METHOD FOR MULTI-ELEMENT STRUCTURES

BACKGROUND OF THE INVENTION

This invention relates generally to manufacture of structures using thin strips of material in their construction, and more particularly, to a method of quickly and inexpensively fabricating such structures. Examples of such structures include cages for small animals, trays for refrigerators, fence panels, traps, etc.

Most known methods of construction for multi-element structures involve many separate fastening steps and are therefore very time consuming. For example, metal structures are often welded. The brittleness of welds makes it preferable that they are numerous and close together to provide strength, but fabrication techniques employing such multiple welds are intricate, time consuming and expensive. After welding is complete, the ends and corners of the structural elements frequently have to be ground and finished to eliminate rough edges further increasing the time required. In addition, for reasons of appearance or physical or chemical protection, the further step of plastic encapsulation will often be made. Another method which is used with either metallic or non-metallic components entails potting of plastic around joints of the complete structure. This method also has drawbacks. A satisfactory bond between components is best obtained if large molds for plastic are provided at points where elements are to be joined. These molds insure that a sufficient quantity of plastic will encase each joint. The molds can be separate parts, or elements of the structure can be formed so as to function as molds. Either technique, however, requires special parts which are time consuming and costly to make. Use of this system in low volume production is limited due to the requirement of special parts. Plastics used in this system have to be very carefully chosen, because shrink or swell of such large volumes as are enclosed in the molds can cause cracks or splits at critical points in the structure. Another disadvantage of this method is that during cure, the structure must be in such a position that the liquid plastic in the molds will not run out.

The object of this invention, therefore, is to provide a method by which multi-element structures can be quickly and inexpensively assembled. It is a further object to provide such a method in which the structures, when assembled, are insensitive to physical shock.

SUMMARY OF THE INVENTION

This invention is characterized by a method of fabricating a metal or plastic latticed framework comprising a plurality of structural members each with surfaces arranged closely adjacent to surfaces of other elements and joined thereto. Attachment is first quickly and temporarily made then firmly and finally accomplished by a plastic encapsulation.

One feature of this invention is the utilization of temporary fastening elements which can be quickly applied. Annular rings or tack welds are examples of attachments that may be used. Only sufficient fastening as is required to hold the framework together during encapsulation is used. Encapsulation may be achieved by any of several techniques, including dipping in liquid plastic, or immersing the preheated framework in plastic in liquid or particulate form. An advantage of this system is that many individual connections between elements are not needed, hence, there is a substantial time saving and cost reduction. Furthermore, a plastic coating is more flexible then connections made by other techniques, such as welding. Also, the relatively thin plastic coating produced by dipping is not appreciably affected by shrink or swell.

DESCRIPTION OF THE DRAWINGS

These and other features of the present invention will become more apparent upon an examination of the following description taken in conjunction with the accompanying drawings wherein.

DESCRIPTION OF THE PREFERRED EMBODIMENTS

Figure 1:
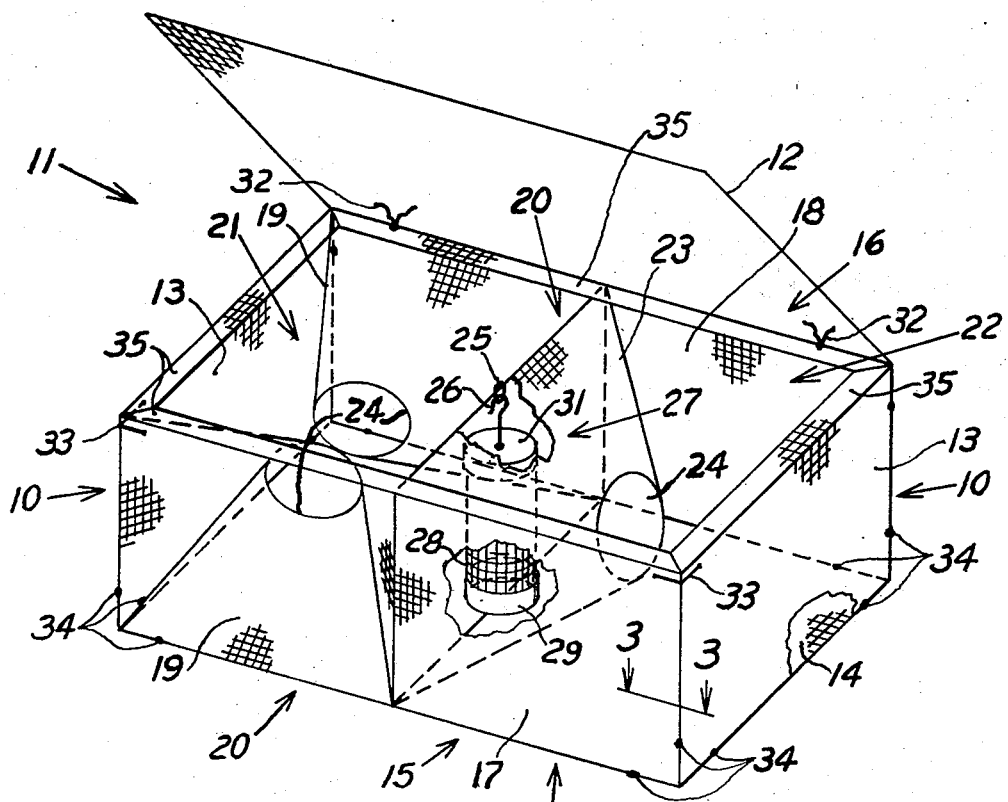
FIG. 1 is a perspective view of a lobster pot constructed according to the methods disclosed herein.

Referring to FIG. 1, there is shown a latticed lobster pot 11 which can be constructed according to the methods described herein. According to one preferred method, the pot 11 is constructed of heavy gauge steel wire screen that is in the form of a box open having open interstices 9 bounded by wire strands as shown more clearly in FIGS. 4 and 6. A removal opening through which lobsters can be removed from the pot 11 is covered by a hinged cover 12. The edges 10 are creases or joints in the screen and will be described hereinafter. The sides 13 and the bottom 14 are flat screen panels; however, the front wall 15 and back wall 16 have flat panel sections 17 and 18 extending only half their lengths. Formed heads 19, in the shape of truncated cones with large rectangular bases 20 and circular or oval apexes 24 are used to complete the front and rear walls 15 and 16. Both apex ends of the heads 19 are open providing entrances through which lobsters pass into a kitchen 21. As shown in FIG. 1, the entrance openings 24 are larger than the interstices 9 so as to permit entry of lobsters into the pot 11 but smaller than the removal opening closed by the cover 12 so as to inhibit escape of captured lobsters. Separating the kitchen 21 from a parlor 22 at the other end of the pot 11, is another formed head 23, also with a rectangular base 20 and a similar apex 24, both open. Attached to the top of the large rectangular base 20 of the head 23 is a loop 25, and hung therefrom by a hook 26 is a bait container 27. A cylindrical body 28 of the container 27 is inserted in a holder 29 which is secured to the bottom of the base 20. A cover 31 to which the hook 26 is attached, is removable to facilitate filling of the container 27. Securing the tip 12 to the back wall 16 are two hinges 32 made of nylon cord, and on the upper corners of the pot 11 opposite the hinges, are catches 33. Disposed on the edges of the pot 11 at substantially separated locations are temporary attachments 34, described in detail below. Extending around the upper edge of the pot 11 is a lip 35.

In the first method fabrication, the temporary attachments 34 are annular rings 34a, which are placed around adjacent wires in screens.

Figure 2:
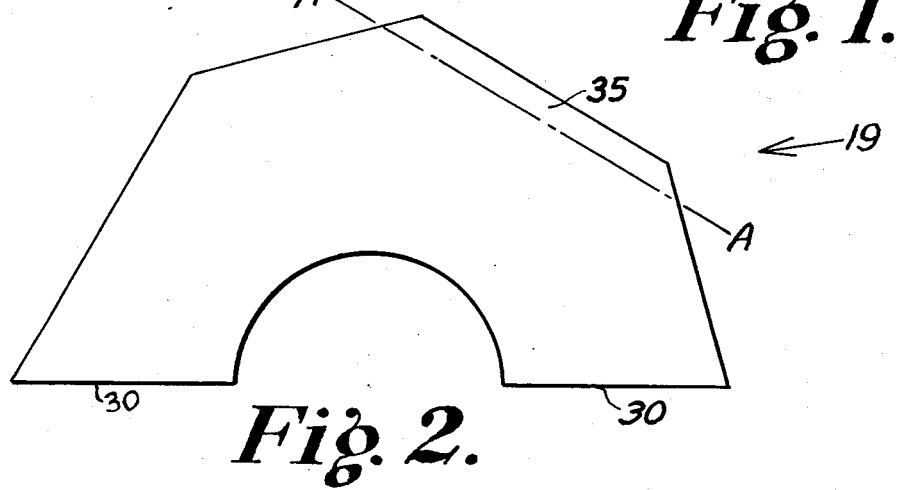
FIG. 2 shows wire mesh cut to form a head for the pot shown in FIG. 1.
Figure 3:
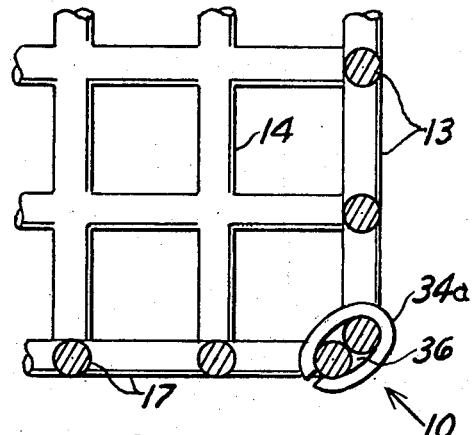
FIG. 3 is a section along the lines 3—3 in FIG. 1 showing in detail a temporary fastening device and an extensive region in the first described embodiment during fabrication.
Figure 4:
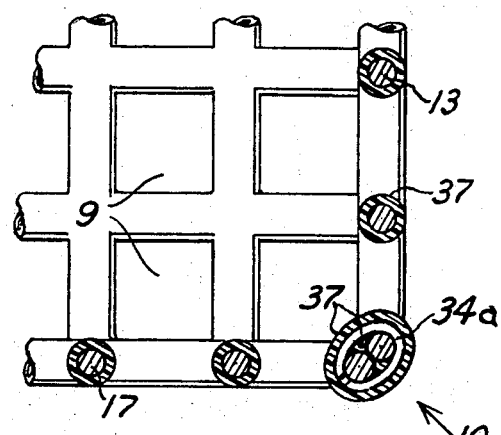
FIG. 4 shows the fastening device and extensive region in FIG. 3 after encapsulation.

During manufacture, two pieces of screen are cut into the characteristic semi-annular shape of an open truncated cone. However, as shown in FIG. 2, the outer edge of each screen is a series of cuts providing the rectangular base 20 and lip 35. After the screen is wrapped and formed around a properly shaped mandril, the adjoining edges 30 of the screen are loosely fastened together with annular rings 34a. Formed head 23 is constructed similarly except no lip 35 is required, therefore the cuts follow line A—A. Rectangular sections for the sides 13 and the flat sections 17 and 18 are cut, and one edge of each is bent to form the lip 35. The flat bottom 14 is then cut. Annular rings 34a are used first to attach the heads 19 and 23 together and to the base 14. A detail of a joint with an annular fastening ring 34a is shown in FIG. 3. Next, the sides 13 and flat sections 17 and 18 are mounted also with rings 34a. The loop 25 and holder 29 are now mounted with rings 34a. Much time is saved during assembly since rings 34a are few in number and applied at only substantially separated locations. Just a temporary connection is made with the rings, and structural integrity is provided by filling extensive regions 36, formed between closely adjacent wires of different screens, with plastic 37 while maintaining the interstices 9 open and then curing the plastic. The extensive regions 36 are filled during encapsulation of the pot 11 which may be accomplished by various techniques. For example, the entire pot 11 can be dipped into a bath of liquid plastic 37 of a viscosity such that the plastic forms a film and coats the pot 11, or the pot 11 can be preheated and immersed in plastic, in liquid or particulate form, becoming coated as the contacting plastic melts or gels. After encapsulation, the plastic 37 is cured. FIG. 4 shows a ring 34a and an extensive region 36 after encapsulation.

The pre-coated top 12, is now installed. This step is also well adapted for mass production, since the hinges 32 are nylon cord, and the top is quickly tied on. A rectangular piece of screen, rolled to a cylindrical shape and coated with plastic 37 forms the bait container 28, and when inserted completes the pot 11.

The pot 11 shown in FIG. 1 may be constructed using an alternate method. In this method the temporary fasteners are welds 34b. The resulting pot 11 is similar to that which was previously described except that a frame, described hereinafter, is used, and the screens consist of substantially finer wire.

Figure 5:
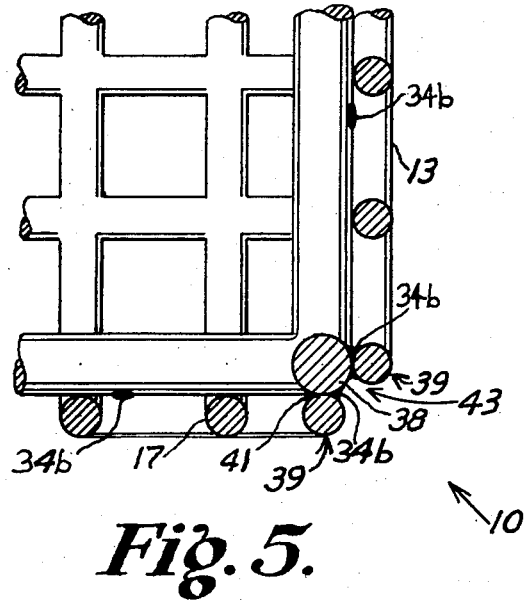
FIG. 5 is a section along lines 3—3 showing in greater detail an extensive region in another preferred method of construction and FIG. 6 shows the extensive region shown in FIG. 5 after filling.
Figure 6:
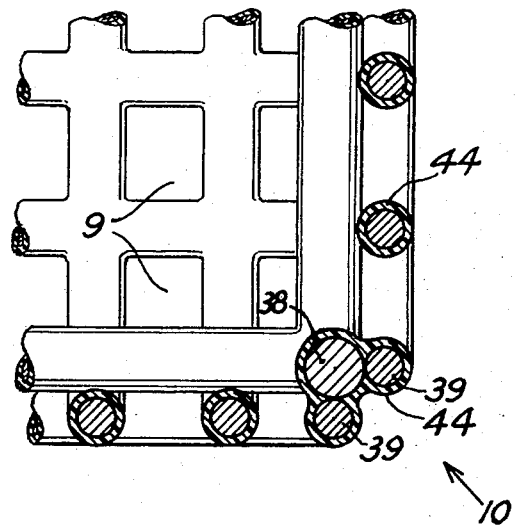

FIG. 5 shows a section of a heavy welded steel frame 38 which extends along all edges 10. One piece of screen may be used for each surface, as in the previously described embodiment, or one piece may be folded around the frame 38 forming several surfaces. Adjacent wires 39 in the screens are secured to the frame 38 by welds 34b. Other welds 34b are used at points substantially separated along extensive regions 43 between the adjacent surfaces. Welds which are sufficient in size and number for temporary holding purposes may be quickly and easily made. The pot 11 is now encapsulated in plastic 44 as shown in FIG. 6. After cure of the plastic 44, which coats the metal and fills the extensive regions 43 between the frame 38 and adjacent wires 39, structural integrity of the pot 11 is greatly enhances. Encapsulation may be by either of the techniques described hereinbefore or by other known methods of encapsulation. The top 12 and bait container 27 are now mounted completing the pot 11.

Obviously, many modifications and variations of the present invention are possible in light of the above teachings. For example, description of the construction of a lobster pot was by way of illustration only, and it will be obvious that many other items may be manufactured by the described methods. It is to be understood, therefore, that the invention can be practiced otherwise than as specifically described.

What is claimed is:

1. A method for constructing a multiple component latticed framework container comprising the steps of;
   a. positioning a plurality of structural elements in an arrangement that establishes a desired unitary latticed framework that defines open interstices, said framework comprising extensive regions in which certain surface portions of some of said structural elements are closely adjacent to certain surface portions of other of said structural elements;
   b. securing said structural elements together at only locations spaced substantial distances apart in said extensive regions so as to provide said framework as a relatively weakly integrated structure;
   c. encapsulating said entire framework with an adherent plastic material so as to cover said structural elements and fill said extensive regions between said adjacent surface portions while maintaining said open interstices; and
   d. curing said adhering plastic to form a bond between all said adjacent surface portions and thereby substantially enhance the structural integrity of said latticed framework.

2. A method according to claim 1 wherein said structural elements comprise elongated rectilinear members, said positioning step comprises arranging pairs of said elongated rectilinear members in directly adjacent substantially parallel relationship, and said extensive regions comprise the elongated area between adjacent surfaces of said pairs of substantially parallel elongated members.

3. A method according to claim 2 wherein said securing step comprises fixing annular securing elements about said parallel elongated rectilinear members at longitudinally spaced apart locations thereon.

4. A method according to claim 2 wherein said securing step comprises producing discrete bonds between said parallel elongated rectilinear members at longitudinally spaced apart positions thereon.

5. A method according to claim 4 wherein said elongated rectilinear members are metallic and said longitudinally distributed bonds are formed by welding steps.

6. A method according to claim 2 wherein said structural elements comprise a plurality of elongated rod members and web material means, and said positioning and securing steps comprise; arranging and securing together said elongated members to form an open sided housing, covering open sides of said housing with said web material means, and securing said rod members to directly adjacent parallel oriented strands of said web material means.

7. A method according to claim 6 wherein said securing step comprises producing discrete bonds between said directly adjacent rod members web strands at longitudinally spaced apart positions thereon.

8. A method according to claim 7 wherein said rod members and web are metallic and said longitudinally distributed bonds are formed by welding steps.

9. A method according to claim 2 wherein said structural elements comprise a plurality of web material sections, said positioning steps comprises arranging said web material sections so as to form a desired enclosure framework, and said certain surface portions comprise strands of some of said web material sections which are adjacent and substantially parallel to strands of other of said web material sections.

10. A method according to claim 6 wherein said securing step comprises fixing annular securing elements about said directly adjacent strands at longitudinally spaced apart locations thereon.

11. A method according to claim 1 wherein said encapsulating step comprises submerging said unitary framework in a body of said adherent plastic material.

12. A method according to claim 11 wherein said body comprises a liquid bath of said adherent plastic material.

13. A method according to claim 12 wherein said body comprises said plastic material in fluid form, and including the step of heating said framework prior to said submerging step.

14. A method according to claim 1 wherein said positioning step comprises arranging a plurality of latticed panels so as to form walls of a cage having a removal opening with individual strands of each of said latticed panels being positioned directly adjacent individual strands in other of said latticed panels to provide said extensive regions.

15. A method according to claim 14 including the step of attaching a removable cover over said removal opening.

16. A method according to claim 15 wherein said panels are arranged in the form of a box.

17. A method according to claim 14 wherein said arranging step comprises forming in one of said walls an entrance opening larger than any of said interstices and smaller than said removal opening.

18. A method according to claim 17 wherein said forming step comprises forming said one wall in the shape of a truncated cone having an apex defining said entrance opening.

* * * * *